United States Patent Office 3,496,134
Patented Feb. 17, 1970

3,496,134
STABILIZATION OF RIGID POLY(VINYLCHLO-
RIDE) PLASTICS WITH BIS-AMIDES AND
ULTRAVIOLET ABSORBERS
Matthew Peter Di Giaimo, Old Bridge, N.J., assignor to American Cyanamid Company, Stamford, Conn., a corporation of Maine
No Drawing. Continuation-in-part of application Ser. No. 386,400, July 30, 1964. This application June 20, 1967, Ser. No. 647,352
Int. Cl. C08f 45/60
U.S. Cl. 260—45.8                                 7 Claims

ABSTRACT OF THE DISCLOSURE

Rigid poly(vinyl chloride) is stabilized against the deteriorating effects of light by the incorporation of a stabilizer comprising a bis-amide and an ultraviolet absorber. Each of the components of the stabilizer may be present in a concentration of at least 0.1% based on the weight of the rigid poly(vinyl chloride).

---

This application is a continuation-in-part of application Ser. No. 386,400 filed July 30, 1964, now abandoned.

This invention relates to the stabilization of rigid poly(vinyl chloride) against degradation by light and heat. It relates further to the resulting stabilized rigid poly(vinyl chloride).

For convenience, "poly(vinyl chloride)" will be referred to throughout the specification as "PVC." As used in this application, the expression "rigid" PVC is intended to mean a vinyl chloride polymeric composition having no plasticizer. "Rigid" PVC is to be distinguished from "flexible" PVC which is PVC containing a significant amount of plasticizer.

The sensitivity to light and heat of both flexible and rigid PVC compositions has been recognized and, to some extent, dealt with, by incorporating in the polymeric compositions to be stabilized, effective amounts of heat or light stabilizers. Recently, the art of stabilizing PVC was advanced by the use, in combination, of members of a specific class of heat stabilizers and members of a specific class of light stabilizers. Thus, in U.S. Patent 2,912,-411, there is disclosed a means of stabilizing PVC compositions by the incorporation therein of a phosphoric amide (as a light stabilizer) and a conventional heat stabilizer (e.g., sodium carbonate, cadmium ricinoleate or an organic epoxy hydrochlorophyl. While there is no definite statement by which the patent is expressly limited to the stabilization of flexible PVC, it is noted in the examples of the patent, that the PVC is in all cases plasticized with dioctyl phthalate. An attempt to stabilize rigid PVC in accordance with the patent teaching leads to discouraging results. Without any plasticizer, heat-stabilized, rigid PVC responds only slightly to the stabilizing effect of the phosphoric triamide. Thus, rigid PVC (i.e., PVC without plasticizer) is made only a bit more light stable as compared with PVC having only the heat stabilizer alone. The increase in stability is only slight and hardly makes the addition of the extra component worth the expense.

This can be seen from the following table.

TABLE I.—RIGID PVC

| Additive Name | Conc. (weight) percent | U.V. exposure hours for $\Delta Y.I.=15$ |
|---|---|---|
| Control | | (¹) |
| Organo-tin-mercaptide | 2 | 130 |
| Organo-tin-mercaptide and Hexamethylphosphoric triamide | 2<br>0.5 | 185 |

¹ Degrades on mill.

The stabilizer found to be very useful for flexible PVC is per se of only questionable use in rigid PVC. In view of this finding, it is an object of the present invention to provide a stabilizing combination which is capable of increasing the stability of rigid PVC. It is a further object to provide the stabilized rigid PVC composition obtained by using the stabilizer of this invention.

These and other objects are accomplished herein with great effectiveness and in a surprisingly simple manner. In accordance with the present invention, rigid PVC which may contain a conventional heat stabilizer, is made stable to light by the addition of a light stabilizer having the following two components:

(1) A bisamide of the following Formula I:

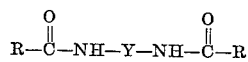

wherein the R's are independently alkyl of 1–18 carbons, alkenyl of 1–18 carbons or N-substituted aminoalkyl of 1–18 carbons; and Y is alkylene (including alkylidene) of 1–18 carbons. The aminoalkyl group may be N-substituted with lower alkyl, cyanoalkyl, hydroxyalkyl, and the like; and (2) An ultraviolet light absorber.

It is indeed surprising that the stabilizer of this invention is as effective as it is since the bisamide component by itself provides very little added stability to rigid PVC. The same bisamide component along with an ultraviolet absorber provides a degree of stability which was not attainable with either component alone.

PVC is normally processed at elevated temperatures during the course of forming it into a shaped article. High temperatures tend to discolor the material if heat stabilizer is not present during the shaping processes. If it is desired to prevent discoloration, a heat stabilizer should be added. If discoloration is not an important problem, the heat stabilizer can be dispensed with. The heat stabilizer which may be used in the PVC for the latter to be processible without discoloration due to high temperatures, can be any of the conventionally available types. In fact, commercial PVC is currently always processed in the presence of a heat stabilizer and the same types which have been previously used, are useful herein in normally effective amounts. Most heat stabilizers are organo-metallic compounds. However, inorganic compounds such as sodium carbonate are also useful. Among the heat stabilizing organo-metallic compounds are the organo-tin compounds (dibutyl tin dimaleate, dibutyl tin dilaurate, dibutyl tin thioglycolic acid octyl ester); the cadmium or barium salts (barium stearate, cadmium stearate, barium ricinoleate, cadmium ricinoleate, baruim octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343–374. It is sometimes desirable to employ in conjunction with the metallic heat stabilizer, an organic phosphite for the purpose of chelating any metal halide which is formed as a decomposition product of PVC.

The amides which are useful in accordance with the present invention are typified by the following members: N,N'-methylenebis-(acrylamide), N-(stearamidomethyl) acrylamide, N,N'-ethylenebis-(stearamide), N,N'-methylenebis-(3-octadecylaminopropionamide), N,N' - [1,1-isobutylidenebis - (3 - dimethylaminopropionamide)], N,N'-ethylidenebis-(acrylamide), N,N' - ethylidenebis - (acetamide), N,N'-methylenebis-(lauramide) and N,N'-methylenebis-[3,3'-bis(cyanoethylamino)propionamide].

The U.V. light absorbers which form the other component of the stabilizer of the present invention are well-known. Generally such ultraviolet light absorbers are of either the 2-hydroxybenzophenone, the 2-(2-hydroxyphenyl)-benzotriazole, the aromatic carboxylic ester, the tri(hydroxyaryl)triazine, the benzothiazole, the benzylidene-malonic ester or the anilino methylene-malonitrilo type. Others may be employed as long as they are compatible with PVC and have the effect of performing the normal U.V. absorber function.

Examples of ultraviolet absorbers which may be used are as follows:

(A) 2-hydroxybenzophenones.—Especially 2-hydroxybenzophenones with at least one additional substituent, for example, 2-hydroxy-4-methoxybenzophenone, 2,4-dihydroxybenzophenone, 2,2'-i-dihydroxy-4-methoxybenzophenone, 2,2',4-4'-tetrahydroxybenzophenone, 2,2'-dihydroxy-4,4'-dimethoxybenzophenone, 2-hydroxy-4-butoxybenzophenone, 2-hydroxy-4-octoxybenzophenone, 2-hydroxy-4-dodecyloxybenzophenone, 2,2'-dihydroxy - 4-octoxybenzophenone, 4'-chloro - 2 - hydroxy-4-octoxybenzophenone, etc. This category of ultraviolet absorber is described in U.S. Patents 2,777,838 issued Jan. 15, 1957; 2,682,559 issued June 29, 1954; 2,693,492 issued Nov. 2, 1954; 2,861,053 issued Nov. 18, 1958; 2,919,259 issued Dec. 29, 1959; 2,976,259 issued Mar. 21, 1961; 3,006,959 issued Oct. 31, 1961, and 3,098,842 issued July 23, 1963.

(B) Benzotriazoles.—Especially the 2-(2-hydroxyphenyl)benzotriazole such as 2-(2-hydroxy-5-methylphenyl)benzotriazole, 2-(2-hydroxy-5-octylphenyl)benzotriazole, 2-(2-hydroxy-4-methoxyphenyl)benzotriazole, 2-(2-hydroxy-3-t-butyl-5-methylphenyl)benzotriazole, 2-(2-hydroxy-3,5,-di-t-butylphenyl)benzotriazole, 2 - (2-hydroxy-3,5-di-t-amylphenyl)benzotriazole, 2 - (2-hydroxy-3,5-di-t-butylphenyl)-5-chlorobenzotriazole, 2 - (2 - hydroxy-3-t-butyl-5-methylphenyl)-5 - chlorobenzotriazole, etc. This class of ultraviolet absorbers is described in U.S. Patents 3,004,896 issued Oct. 17, 1961, 3,018,269 issued Jan. 23, 1962 and 3,271,339 issued Sept. 6, 1966.

(C) Aromatic esters.—Phenyl salicylate, tertiarybutylphenyl salicylate, phenyl resorcylate, p-octylphenyl benzoate, bis(p-nonylphenyl) isophthalate, bis(p-nonylphenyl) terephthalate, etc. Such aromatic esters are typically described in U.S. Patent 3,146,217 issued Aug. 25, 1964.

(D) Triazines.—Especially triazines having at least one o-hydroxyphenyl substituent such as 2,4,6-tris(2-hydroxy-4-octyloxyphenyl)-s-triazine, 2 - (2 - hydroxy-4-octyloxyphenyl)-4,6-dixylyl-s-triazine, etc. Such triazines are described in U.S. Patents 3,118,887 issued Jan. 21, 1964, 3,293,247 and 3,293,249, both of which issued Dec. 20, 1966.

(E) Benzothiazoles and benzothiazolines.—2-anilinobenzothiazole, 2-(N-methylanilino)benzothiazole, 2-(4-methoxyanilino)benzothiazole, 2 - (2 - methoylphenylimino)-3-ethylbenzothiazoline, 2-phenylimino-3-ethylbenzothiazoline and 2-(β-naphthylimino)benzothiazoline, etc.

(F) Benzylidine-malonic esters.—Diethyl p-methoxybenzylidenemalonate, diethyl o-methoxybenzylidenemalonate, diethyl p-hydroxybenzylidenemalonate, diethyl diphenylmethylenemalonate, etc. This specific class of ultraviolet absorbers is disclosed in copending application Ser. No. 389,210 filed Aug. 12, 1964. Additional ultraviolet absorbers of the benzylidene type are also disclosed in U.S. Patent 3,244,668 issued Apr. 5, 1966.

(G) Arylaminoethylenes.—Especially N-methyl p-methoxyanilinomethylenemalonitriles such as diphenylaminomethylenemalononitrile and N-methyl-p-methoxyanilinomethylenemalononitrile. This class of ultraviolet absorbers is more fully disclosed in U.S. Patent 3,079,366 issued Feb. 26, 1963.

(H) Guanidines.—Especially 1,2-dibenzoyl-3-arylguanidines such as 1,2-dibenzoyl-3-(p-methoxyphenyl) guanidine; 1,2-dibenzoyl-3-(p-chlorophenyl)guanidine; 1-2-di-(p-methoxybenzoyl) - 3 - (p-methoxyphenyl)guanidine, etc. These ultraviolet absorbers are disclosed more fully in copending application Ser. No. 386,386 filed July 30, 1964.

(I) Cyanoacrylonitrile and cyanoacrylic acid derivatives.—Especially aryl substituted compounds such as β-(diphenyl)-α-cyanoacrylic acid ethyl ester, β-(diphenyl)-α-cyanoacrylic acid octyl ester, α-phenylbenzylidene - malononitrile, diphenylbenzylidene - malononitrile, etc. This type of ultraviolet absorber is more fully disclosed in U.S. Patents 3,074,971 issued Jan. 22, 1963, 3,085,097 issued Apr. 9, 1963, 3,111,417 issued Nov. 19, 1963, 3,149,146 issued Sept. 15, 1964, 3,215,724 issued Nov. 2, 1965 and 3,278,448 issued Oct. 11, 1966.

Any ultraviolet absorber can be used for the purposes of the present invention so long as it performs the functions generally required of an ultraviolet light absorber. These functions are well-known to be absorbency in the region of about 300–400 millimicrons, low absorbency above about 400 millimicrons, solubility in and compatibility with polymers and stability to light and heat. This invention is not limited to the use of the above-named types and embraces the use of all types of ultraviolet absorbers.

The amount of ultraviolet absorber should be between 0.1 and 3.0%, preferably between 0.2 and 1.0%, based on the weight of the rigid PVC. The amount of bisamide should be between 0.1 and 5.0%, preferably between 0.2 and 0.6%, based on the weight of the PVC. As will be noted, the bisamide concentration can be, and preferably should be, equal to the concentration of the ultraviolet absorber. The stabilizer of the present invention may be added as a whole to the rigid PVC or the components may be added separately. Generally and preferably, a heat stabilizer is first put into the PVC and the light stabilizer components are then incorporated into this blend by conventional milling procedures. After thorough blending, the PVC can then be shaped into a film or other article or manufacture by compression-molding, extrusion, injection-molding, calendering, etc.

Other additives may be employed to modify the rigid PVC for the intended application. Among such additives are fillers, antistatic agents, pigments, dyes, etc.

The following examples, in which parts and percentages are on the basis of weight, are presented to further illustrate the present invention.

EXAMPLE 1

Films of 50-mil thickness are prepared from a nonplasticized PVC composition containing 2.0% of a commercial organo-tin-mercaptide as heat stabilizer. All but the control sample are formulated with at least one additional additive. The films are exposed to ultraviolet light using a Fluorescent Sunlamp-Blacklight (FS–BL) lamp. The exposure is continued until the tested sample shows a change in yellow index (Y.I.) of 15. This increase in yellow color is determined on a differential colorimeter ("Colormaster") using the following formula (see Example 8, U.S. Patent No. 3,079,366):

$$\text{Yellow Index} = 70\left(1 - \frac{\text{Blue}}{\text{Green}}\right)$$

The following additives were used in this test:

Additive A.—2-hydroxy-4-methoxybenzophenone
Additive B.—N,N′-methylenebis-(acrylamide)
Additive C.—N-(stearamidomethyl)-acrylamide
Additive D.—N,N′-ethylenebis-(stearamide)
Additive E.——Diethyl p-methoxybenzylidenemalonate The results are given in the following table.

TABLE II

| Additive | | | FS-BL exposure (hours) to ΔY.I. of 15 |
|---|---|---|---|
| Number: | Name | Percent | |
| 1 | None | | 130 |
| 2 | A | 0.5 | 420 |
| 3 | B | 0.5 | 80 |
| 4 | E | 0.5 | 620 |
| 5 | A / B | 0.5 / 0.5 | 780 |
| 6 | A / C | 0.5 / 0.5 | 680 |
| 7 | E / B | 0.5 / 0.5 | 860 |
| 8 | A / D | 0.5 / 0.5 | 820 |

From Table II it can be noted that the bisamide component by itself gives virtually no stability to rigid PVC over that resulting from the presence of the heat stabilizer in the PVC. It can also be noted that the individual ultraviolet light absorbers, while enhancing the stability of the rigid PVC to a large extent, do not approach the effectiveness of the combination stabilizer in accordance with the present invention.

Other ultraviolet absorbers of the classes outlined above can be substituted for the ultraviolet absorbers used in Example 1, with equal effectiveness. Likewise, other bisamides can also be used in place of Additives B, C and D with equivalent results.

EXAMPLE 2

The following experiment was carried out to illustrate the stabilizing efficiency of absorbers and/or absorber-amide combinations in rigid PVC containing *no* heat stabilizer.

The polymer sample was compression molded directly from the powder form, either alone or in combination with the light stabilizer. Samples without heat stabilizer became discolored. The compression molded films (10–15 mils) were exposed in the FS/BL unit, and the yellowness index was measured at 170 and 350 hours of exposure. As seen from the data below, both samples containing the UV absorber and absorber-amide combination, respectively, discolored to a lesser extent than the control sample. The light stabilized samples were also less colored than the control sample which contained a heat stabilizer.

| Sample | FS/BL Exposure, Yellowness Index | |
|---|---|---|
| | 170 hours | 350 hours |
| Control (no heat stabilizer) | 31 | 45 |
| 1.0% 2-hydroxy-4-methoxybenzophenone (no heat stabilizer) | 6 | 13 |
| 0.5% 2-hydroxy-4-methoxybenzophenone plus 0.5% methylene-bis-acrylamide (no heat stabilizer) | 4 | 10 |
| Control plus 2.0% heat stabilizer | 11 | 29 |

EXAMPLE 3

Additional combinations were tested by the method of Example 1. Results are reported in the following tables.

TABLE III.—UV ABSORBER COMBINATIONS WITH METHYLENE-BIS-ACRYLAMIDE

| Sample | Percent Conc. | Initial Y.I. | FS/BL exposure hours to Δ(YI) of 15 |
|---|---|---|---|
| Control | | 5 | 170 |
| Ethyl 2-cyano-3,3-diphenylacrylate | 0.5 | 5 | 650 |
| Do | 1.0 | 5 | 850 |
| Ethyl 2-cyano-3,3-diphenylacrylate plus methylene-bis-acrylamide (0.5% each) | 1.0 | 4 | 1,000 |
| 2(2-hydroxy-5-methylphenyl)-benzotriazole | 0.5 | 3 | 760 |
| 2(2-hydroxy-5-methylphenyl)-benzotriazole plus methylene-bis-acrylamide (0.5% each) | 1.0 | 3 | 1,161 |
| p-tert-Butylphenylsalicylate | 1.0 | 5 | 130 |
| p-tert-Butylphenylsalicylate plus methylene-bis-acrylamide (0.5% each) | | 4 | 380 |
| 2,4-bis(2,4-dimethylphenyl)-6-(2-hydroxy-4-octyloxyphenyl)-s-triazine | 1.0 | 6 | 290 |
| 2,4-bis(2,4-dimethylphenyl)-6-(2-hydroxy-4-octyloxyphenyl)-s-triazine plus methylene-bis-acrylamide (0.5% of each) | 1.0 | 5 | 450 |

TABLE IV.—UV ABSORBER COMBINATIONS WITH BUTYLIDENE-BIS-ACRYLAMIDE

| Sample | Percent Conc. | Initial Y.I. | FS/BL exposure hours to Δ(YI) of 15 |
|---|---|---|---|
| Control | | 5 | 170 |
| Butylidene-bis-acrylamide | 1.0 | 8 | 170 |
| 2-hydroxy-4-methoxybenzophenone | 1.0 | 7 | 560 |
| 2-hydroxy-4-methoxybenzophenone plus butylidene-bis-acrylamide (0.5% each) | 1.0 | 7 | 920 |

I claim:
1. Rigid poly(vinyl chloride) stabilized against the deteriorating effects of light by having incorporated therein:
(a) a bis-amide of the formula:

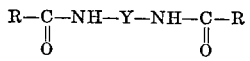

wherein Y is a member selected from the group consisting of alkylidene and alkylene of 1–18 carbons and each R is a member selected from the group consisting of alkyl of up to 18 carbons, alkenyl of up to 18 carbons and N-substituted aminoalkyl of up to 18 carbons in which the substituents are members selected from the group consisting of lower alkyl, cyano(lower alkyl) and hydroxy(lower alkyl); and
(b) an ultraviolet absorber, said ultraviolet absorber being a compound which is characterized by absorbency of light in the region of 300–400 millimicrons and low absorbency of light above 400 millimicrons and also by solubility in and compatibility with poly(vinyl chloride) and stability to light and heat each of said materials (a) and (b) being present in a concentration of at least 0.1%, based on the weight of the rigid poly(vinyl chloride).

2. Rigid poly(vinyl chloride) stabilized against the deteriorating effects of light by having incorporated therein:

(a) a bis-amide of the formula:

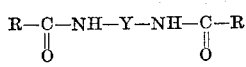

wherein Y is a member selected from the group consisting of alkylidene and alkylene of 1–18 carbons and each R is a member selected from the group consisting of alkyl of up to 18 carbons, alkenyl of up to 18 carbons and N-substituted aminoalkyl of up to 18 carbons in which the substituents are members selected from the group consisting of lower alkyl, cyano(lower alkyl) and hydroxy(lower alkyl); and (b) an ultraviolet light absorber slected from the group consisting of 2 - hydroxybenzophenones, 2 - (2-hydroxyphenyl) benzotriazoles, aromatic esters, 2,4,6-tris(2 - hydroxyphenyl) - s-triazines, benzothiazoles, benzothiazolines, arylamino ethylenes, benzylidine-malonic esters, guanidines, cyanoacrylonitriles and cyanoacrylic acids, each of said materials (a) and (b) being present in a concentration of at least 0.1%, based on the weight of the rigid poly(vinyl chloride).

3. The composition of claim 2 wherein the ultraviolet absorber is a 2-hydroxybenzophenone.

4. The composition of claim 2 wherein the ultraviolet absorber is a 2(2-hydroxyphenyl)benzotriazole.

5. The composition of claim 2 wherein the ultraviolet absorber is a benzylidene-malonic ester.

6. The composition of claim 2 wherein the ultraviolet absorber is a cyanoacrylonitrile.

7. The composition of claim 2 wherein the ultraviolet absorber is a cyanoacrylic acid.

References Cited

UNITED STATES PATENTS

| | | | |
|---|---|---|---|
| 2,648,650 | 8/1953 | Weinberg et al. | 260—45.75 XR |
| 2,919,259 | 12/1959 | Naylor et al. | 260—45.95 |
| 2,921,048 | 1/1960 | Bell et al. | 260—45.9 |
| 3,079,366 | 2/1963 | Boyle et al. | 260—45.9 |
| 3,118,887 | 1/1964 | Hardy et al. | 260—45.8 X |
| 3,214,436 | 10/1965 | Boyle et al. | 260—45.8 X |
| 3,239,478 | 3/1966 | Harlan | 260—45.8 X |
| 3,244,668 | 4/1966 | Knapp et al. | 260—45.85 |

FOREIGN PATENTS 1,086,182  2/1955  France.

OTHER REFERENCES

Chevassus et al., The Stabilization of Polyvinyl Chloride, St. Martin's Press, Inc., N.Y., 1963, TP986 V48C 45E 1963, pp. 165–169, 306.

Chevassus et al., The Stabilization of Polyvinyl Chloride, St. Martin's Press, Inc., N.Y., 1963, p. 351.

DONALD E. CZAJA, Primary Examiner

M. J. WELSH, Assistant Examiner

U.S. Cl. X.R.

260—45.9, 45.85